March 23, 1926.  
C. NIELSEN, JR  
1,577,847  
TEMPERATURE INDICATOR APPARATUS FOR COOLING SYSTEMS OF EXPLOSIVE ENGINES  
Filed July 14, 1917
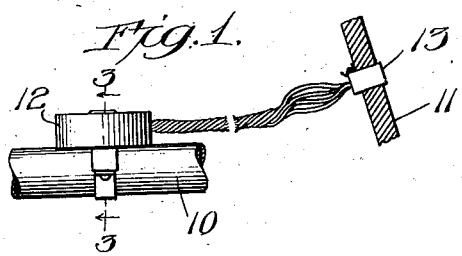
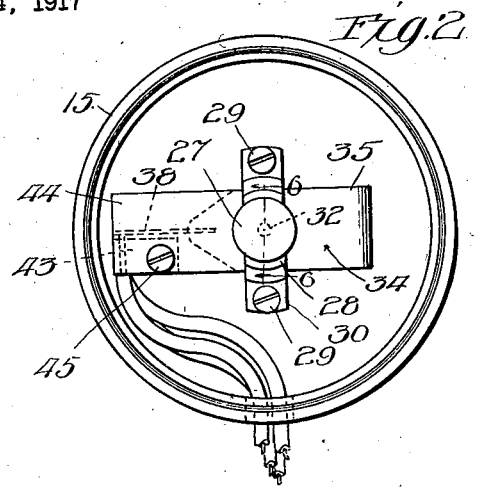
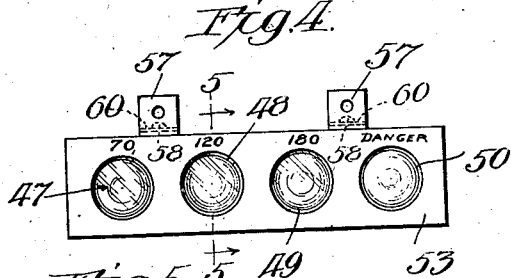
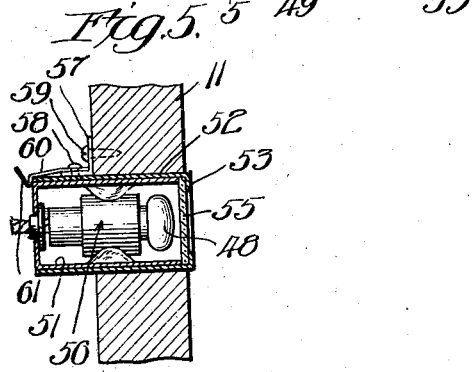
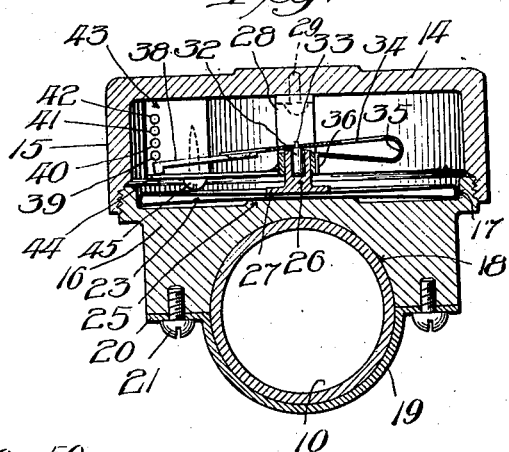
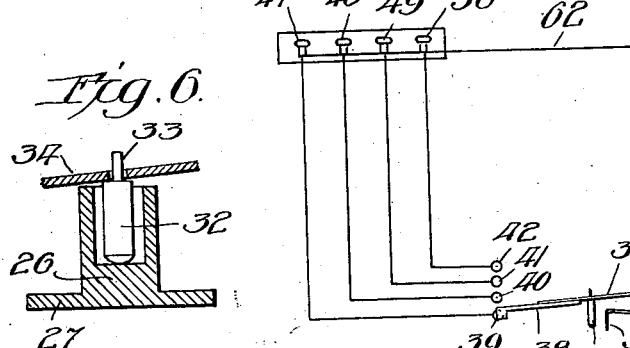
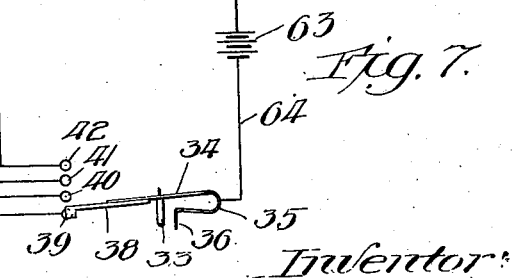
Witness:  
Harry S. Gruther
Inventor:  
Christian Nielsen Jr.  
by William H. Hale Atty Patented Mar. 23, 1926.

1,577,847

UNITED STATES PATENT OFFICE.

CHRISTIAN NIELSEN, JR., OF CHICAGO, ILLINOIS.

TEMPERATURE-INDICATOR APPARATUS FOR COOLING SYSTEMS OF EXPLOSIVE ENGINES.

Application filed July 14, 1917. Serial No. 180,688.

*To all whom it may concern:*

Be it known that I, CHRISTIAN NIELSEN, Jr., a citizen of the United States, and a resident of Chicago, in the county of Cook and State of Illinois, have invented certain new and useful Improvements in Temperature-Indicator Apparatus for Cooling Systems of Explosive Engines; and I do hereby declare that the following is a full, clear, and exact description thereof, reference being had to the accompanying drawings, and to the characters of reference marked thereon, which form a part of this specification.

This invention relates to improvements in motor meters, or devices for indicating the temperature of the cooling liquid in the cooling system of an explosion engine. The device as herein shown has been designed more particularly for use in connection with explosion engines for automobiles.

As adapted to this latter use the device is that type which consists of a thermic member which is located to be directly influenced by the temperature of the cooling liquid which flows through the closed cooling system of the engine, whereby the thermic element of said member is at all times influenced by the temperature of said liquid; and associated with said thermic element is a circuit controller which makes and breaks circuits, in which is included a battery, or other source of electrical energy. Said circuit controller embraces a member which is caused to move over contacts by which signalling devices located in said circuits are energized. In accordance with my invention, said signalling device embraces a plurality of lamps in circuits and so controlled as to continuously indicate at the signalling device ranges of temperature from the energizing terminals indicating dangerous hot and cold temperatures, and intermediate driving temperatures, and thereby enable the driver to at all times determine the temperature and efficiency of the engine. In practice, the signalling device will preferably be located on the mounting plate at the dashboard of the vehicle which carries the various accessories, such as the speedometer, the illuminating lamp therefor, etc.

I have shown in the drawing one practical form of the device which has demonstrated efficiency in practical tests, and in the following description reference will be made to the structural details of the illustrated device. It will be understood, however, that the invention, in its broader aspect, is not limited to this particular form of the device, except as to claims wherein structural details are specifically set forth.

In the drawings:—

Figure 1 is a fragmentary view illustrating the installation of the device on an automobile engine.

Figure 2 is a bottom plan view, with parts removed, of the thermic device and the casing containing the same.

Figure 3 is an enlarged section on the line 3—3 of Figure 1.

Figure 4 is a rear face view of the indicating device.

Figure 5 is a section on the line 5—5 of Figure 4, showing the mounting plate in section.

Figure 6 is an enlarged section on the line 6—6 of Figure 2.

Figure 7 is a diagram of the circuits.

As shown in the drawings 10 designates the manifold pipe of the cooling system of an explosion engine and 11 designates, diagrammatically the mounting plate at the dashboard for the various engine and electrical accessories. 12 designates as a whole the thermic device, which is associated with the manifold 10, and 13 designates as a whole the signalling device at the dashboard.

The thermic device comprises a casing which is composed of an upper member 14 having, as herein shown, a cylindric enclosing wall 15, and a lower member or base 16 which is removably secured to the casing wall, being herein shown as provided with an externally screw threaded annular flange 17 that engages internal screw threads in the wall 15. The said base member 16 is shown as made relatively massive and is formed to provide a semicircular saddle or seat 18 which fits over the pipe 10 and may be held thereon by any suitable clamping means, as, for instance, a strap 19 which encircles the lower side of the pipe and is provided with lugs 20 through which extend fastening or clamping screws 21 that are screw threaded to the member 16. The construction shown provides means to locate the thermic element in heat conducting relation to the cooling water that flows through the pipe 10, and one that can be readily adapted to the engine, but such thermal association may be otherwise arranged without departure from the spirit of the invention.

Contained within said casing thus formed is a thermic cell 23 which, as herein shown, is composed of upper and lower thin sheet metal walls that are bound together at their edges in any suitable manner, as by a seam joint or by solder. Said thermic cell is adapted to contain a volatile substance which has a large co-efficient of expansion under heat, such, for instance, as ether. Preferably, and as herein shown, the upper and lower walls of the cell are concave on their outer sides so that their centers lie close together. The central portion of the lower wall of the cell is supported by an abutment consisting of a central upstanding or thickened portion 25 of the lower or base member of the casing. Supported centrally on the upper concave wall of the cell is a bearer 26, provided with a flattened head 27, extending upwardly through a guide opening in a yoke 28 arranged transversely across the axis of the upper casing wall and is attached to said latter wall by means of screws 29 which extend through openings in the feet 30 of said yoke and into said wall.

Said bearer is provided with an axial, upwardly opening socket in which loosely fits a short pin 32, said pin being of smaller diameter than the socket. The lower end of said pin is preferably rounded to engage the bottom of the socket. The upper end of the pin terminates in an axial extension 33 which projects beyond the upper end of the bearer and loosely through an opening in one arm 34 of a general U-shaped spring 35; the other arm of which is provided with a downturned portion or terminal 36 which is soldered or otherwise secured to one side of the central member of the yoke 28. The arm 34 of said spring extends beyond the pin at the side of the axis of the casing remote from the closed portion of the spring and terminates in a contact arm 38 of a circuit controller. As herein shown said contact arm is made a part separate from, and is soldered or otherwise suitably attached to, the spring arm 34.

The said controller arm 38 is adapted to wipe over a series of contacts 39, 40, 41 and 42 that are supported on an insulating block 43 which is located within the casing and is supported on or attached to a fixed or rigid arm 44 that extends radially from and is carried by the yoke 28; said block being herein shown as fixed to said arm by a screw 45.

The signalling device comprises a series or plurality of lamps 47, 48, 49 and 50 which are contained within a suitable casing, designated as a whole by 13, and removably mounted in the mounting plate 11. Said casing may be made of any suitable construction. As herein shown, it comprises an inner oblong rectangular member 51 of general U-shape in cross section, and closed at its forward end, and an outer, like shaped member 52 that is open at its forward end and is slipped over the inner member. The outer member 52 is provided with a front wall 53 having a plurality of openings, severally in line with the signalling lamps 47, 48, 49 and 50. Preferably a sheet, or sheets, of glass 55 is placed behind said wall 53 and is confined between said wall and the edges of the side and end walls of the inner member. The lamps are seated in sockets 56 which are supported in the inner casing member in any suitable manner.

The manner herein shown of connecting the signal casing to the mounting plate 11 consists in providing the mounting plate with an oblong opening of a size into which the casing closely fits, with the casing substantially flush at its rear side with the rear face of the mounting plate. 57, 57 designate angle brackets which are secured to the outer casing by rivets 58 and are attached to the front face of the mounting plate by screws 59. 60, 60 designate spring latches which may be attached to the brackets by the rivets 58 and extend forwardly beyond the opening end of the outer casing 52 and are there formed with projections 61 adapted to engage over the front closed side of the inner casing when the latter is in place. Said latches lock the inner casing member and the lamp mountings in place in the outer casing member and permit said inner casing member and the lamps to be withdrawn forwardly from the outer casing member.

One terminal of each lamp 47, 48, 49 and 50 is connected by a conductor to one of the contacts 39, 40, 41 and 42 of the controller. If the lamp sockets be grounded to the casing, said casing is connected by a common conductor 62 to a battery 63, or other suitable sources of current supply, and said battery is connected to the spring 35 by a conductor 64. This connection may be either direct to the spring or the conductor may be connected to the casing to which the spring is grounded. In the present construction it is assumed that the lamp sockets 56 are grounded to the casing, this grounded connection being indicated by a common wire in the diagrammatic view of Figure 7.

The operation of the device described is as follows:

When the thermic element is clamped to the pipe 10 or is otherwise brought into heat conducting relation to the fluid of the cooling system, heat from the cooling fluid is communicated freely to the thermic element. In the present construction, its central raised portion 25 of the upper side of the base member of the casing constitutes an abutment against which the central portion of the lower wall of the thermic cell 23 rests.

The heat thus transmitted to the thermic cell acts to expand the fluid contained in the cell and, by reason of the double concave walls of the cell, the movement of the upper wall of the cell, due to the expansion of the volatile medium therein is multiplied. This movement of the cell walls acts to force the bearer 26 upwardly and said bearer acts, through the medium of the pin 32, to swing the upper arm 34 of the spring about a fulcrum at the closed portion of the spring and thereby causes the controller arm 38 to wipe over the contacts 39, 40, 41 and 42. When the apparatus is not in use the controller arm is out of engagement with all of the contacts, as shown in Figure 3. The angular operating range of sweep of movement of said controller arm is so proportioned to the character of the thermic medium and the temperature which acts upon the same that the movement of said arm over the contacts is such that as the temperature rises independent circuits are closed through the lamps 47, 48, 49 and 50 to produce independently distinguishable signals by reason of relative positions of lamps to each other and to distinguishing insignia. It may be assumed that when the controller arm is engaged with contact 39 the temperature of the cooling medium to move said arm to this point to operate lamp 47 is 70 degrees F.; when engaged with contact 40 the temperature of the cooling medium to operate lamp 48 is 120 degrees F.; when engaged with the contact 41 the temperature of the cooling medium to operate lamp 49 is 180 degrees F., and when engaged with the contact 42 the temperature of the cooling medium to operate lamp 50 is beyond a safe point; and a suitable legend is associated with said lamp 50 to indicate danger. The construction of the cell, in combination with the engagement of its lower wall with a fixed abutment that is delicately responsive to temperatures and with the loose connection of the pin 32 with the bearer and with the spring arm 34 permits the temperature which is impressed on a thermic cell to be accurately registering at the signal device, so that the driver of the automobile is aware at all times of the temperature conditions of the cooling medium of the engine.

The structure described is an article of manufacture which may be readily applied to an engine and to the car by any one possessing ordinary mechanical and electrical knowledge. The signals are constantly exposed to the driver of a car, and the device comprises thermic means to correspond to temperature ranges of the cooling medium to produce a predetermined, sequential excitation of the signal means.

A further advantage of the indicator, comprising the plurality of lamps separately to be energized by varying temperatures, is that one of the lamps, 47 to 50 inclusive, is always lighted and gives its proper signal, so that the driver is aware of the temperature of the cooling water in the closed system of the engine at all times. The lamps 47 and 50 constitute, respectively, the emergency signals, one to give indication of coolness and the other to give indications of boiling.

The intermediate lamps 48 and 49, or as many intermediate lamps as may be required, give indications of safe driving and enables the driver to operate all the functions of the engine to correspond therewith. The lamps being differentiated by colors, calls direct and sudden attention to the condition of the temperature of the cooling water, and the continuous excitation of the thermic element produces corresponding, continuous excitations of the lamps.

The structure described is an article of manufacture which may be readily applied to an engine and to a car by any one possessing ordinary mechanical and electrical knowledge. The signals are constantly exposed to the driver of a car, and the device comprises thermic means constructed for sequel excitation of circuits to correspond to temperature ranges of the cooling medium to produce a predetermined sequential excitation of the signal means.

An advantage of the construction described, in addition to its accuracy and its extreme simplicity, it being noted that the controller is free from specially formed pivots, is the fact that the thermic device is capable of being fitted to any standard automobile engine, it being only necessary, in applying the device to different engines, to change or vary the base member 16 and its clamping strap 19 in order to secure an accurate fit between the contacting surfaces of the base member and said pipe.

By the use of the apparatus described, the driver of the car is apprised at all times of the temperature of the cooling medium, by which the explosion engine is properly cooled, and with his experience of the particular explosion engine employed and its cooling system he is enabled at all times to keep the engine conditions under such observations as will make it possible to secure the best efficiency therefrom. It is well known that in the ordinary water cooled engine, the cooling of the engine is directly opposed to its efficiency but, as the engines are usually designed, it is necessary to provide such cooling effect as will avoid overheating of the engine apparatus. It is, therefore, highly desirable that the driver of the car can at all times observe the prevailing temperature of the water, and knowing its temperature relatively to the particular type of engine which he is using, he is able to be at all times apprised whether the engine is operating efficiently or not merely by observing the indicating device at the dash. The use of lamps in the indicating circuit is a highly desirable one inasmuch as it enables the temperature of the cooling medium to be observed when driving at night, as well as day, and the employment of different colored panels in the signal box over the several lamps will facilitate accurate observation, which will enable the driver to know when his engine is operating efficiently and to relieve such conditions as work against inefficient operation. The apparatus is, moreover, more than a mere signal alarm apparatus to indicate ultimate danger which requires immediate attention but is an apparatus which is constantly before the driver of a car and which gives him opportunity for continuous observance of engine efficiency due to his knowledge and experience with a given engine and the temperature of the cooling medium which produces the best results in operation.

I claim as my invention:—

1. A device for the purpose set forth comprising a thermic cell having means to centrally support one wall thereof through which means heat is conducted to the cell, a socketed bearer seated centrally against the other wall of said cell, a fixed guide for said bearer, a pin loosely mounted in the socket of the bearer, and provided with a prolongation, a spring controlled arm having an opening through which said prolongation loosely extends and a series of signal circuit contacts over which said switch arm sweeps.

2. A device for the purpose set forth comprising a heat conducting member adapted to be fixed to and against the wall of a cooling medium circuit of an explosive engine and provided with a central abutment, a thermic cell having concave walls, one wall of which is centrally supported by said abutment, a bearer seated against other concave wall of said cell, a switch arm operatively connected to and actuated by said bearer and a series of terminal contacts over which said switch arm sweeps.

3. A device for the purpose set forth comprising heat conducting member adapted to fit against the wall of the cooling medium circuit of an explosive engine, with means to fasten it against said wall, a thermic cell one wall of which is centrally supported by said member, a bearer seated centrally against the other wall of said cell, a fixed guide for said bearer, a spring attached to said guide and folded upon itself and extending across said bearer and carrying a switch arm, operative connections between said bearer and the latter member of said spring, and a series of contact terminals over which said switch arm sweeps.

4. A device for the purpose set forth comprising heat conducting member adapted to fit against the wall of the cooling medium circuit of an explosive engine, with means to fasten it against said wall, a thermic cell, one wall of which is centrally supported by said member, a bearer seated against the other wall of said cell, a fixed guide for said bearer, a spring attached to said guide and folded upon itself and extending across said bearer and carrying a switch arm, said bearer being provided with a socket, a pin loosely seated in said and engaging said latter arm and a series of terminal contacts over which said switch arm sweeps.

In testimony that I claim the foregoing as my invention I affix my signature this 29th day of June, A. D. 1917.

CHRISTIAN NIELSEN, Jr.